Oct. 7, 1958  R. C. P. JACKSON  2,855,126
HYDROGEN PEROXIDE FUEL DISPENSING VEHICLE
Filed Sept. 13, 1956  2 Sheets-Sheet 1

INVENTOR.
ROBERT C.P. JACKSON

Oct. 7, 1958    R. C. P. JACKSON    2,855,126
HYDROGEN PEROXIDE FUEL DISPENSING VEHICLE
Filed Sept. 13, 1956    2 Sheets-Sheet 2

INVENTOR.
ROBERT C. P. JACKSON
ATTORNEYS

United States Patent Office 2,855,126
Patented Oct. 7, 1958

2,855,126

HYDROGEN PEROXIDE FUEL DISPENSING VEHICLE

Robert C. P. Jackson, Manhattan Beach, Calif., assignor, by mesne assignments, to the United States of America as represented by the Secretary of the Navy Application September 13, 1956, Serial No. 609,783

5 Claims. (Cl. 222—135)

The invention relates to fuel handling equipment, and more particularly to a vehicle capable of storing and dispensing highly volatile fuel, such as hydrogen peroxide, efficiently and safely.

High-powered liquid fuels, particularly highly concentrated hydrogen peroxide, used in rocket motors for guided missiles, aircraft and the like are unstable and sensitive mixtures and extremely hazardous being readily explosive in the presence of impurities, dust being the most common, which act as catalytic agents. Accordingly, the equipment for servicing aircraft using hydrogen peroxide fuel should have certain safety provisions for the service and storage of such fuel without retarding efficient handling, and usable under different operational conditions and environment.

The fuel servicing vehicle of this invention is most suitably employed as a trailer having a dust-proof, insulated metal body in which the fuel is stored and dispensed from, the interior surfaces of the body being specially treated to avoid rust. One wall of the trailer body is open being closable by a rupturable curtain to provide a fail-safe area in the event of an explosion. The curtain can be quickly rolled up or otherwise uncovered and secured in an open position to permit dispensing of the fuel through said opening. In a closed position, the curtain is sealed to the body by readily detachable fasteners to ensure a dustproof enclosure. The body is provided with a slidable platform on which the fuel containers are supported either completely within the body or in an extended position outside the body. The body mounts an extensible water shower fixture for washing fuel leakage from the containers and the protective clothing of trailer personnel. A water tank on the trailer supplies the shower and a safety hose which can be extended to the vicinity of the vehicle being serviced. The trailer also houses an electrical system for the various pumps, and a gas supply for the dispensing system.

A principal object of this invention is to provide a self sufficient fuel dispensing vehicle capable of safely storing and dispensing highly unstable fuels.

Another object is to provide a dustproof trailer body having an open end for dispensing fuel and closable by a detachable rupturable curtain to form a fail-safe area.

A further object is to provide a trailer body with a slidable platform for supporting fuel containers inside the body and extendable outside the body.

A still further object is to provide a trailer with a water system for washing away fuel leakage in storage or dispensing operations.

Other objects and many of the attendant advantages of this invention will be readily appreciated as the same becomes better understood by reference to the following detailed description when considered in connection with the accompanying drawings wherein.

Figure 1:
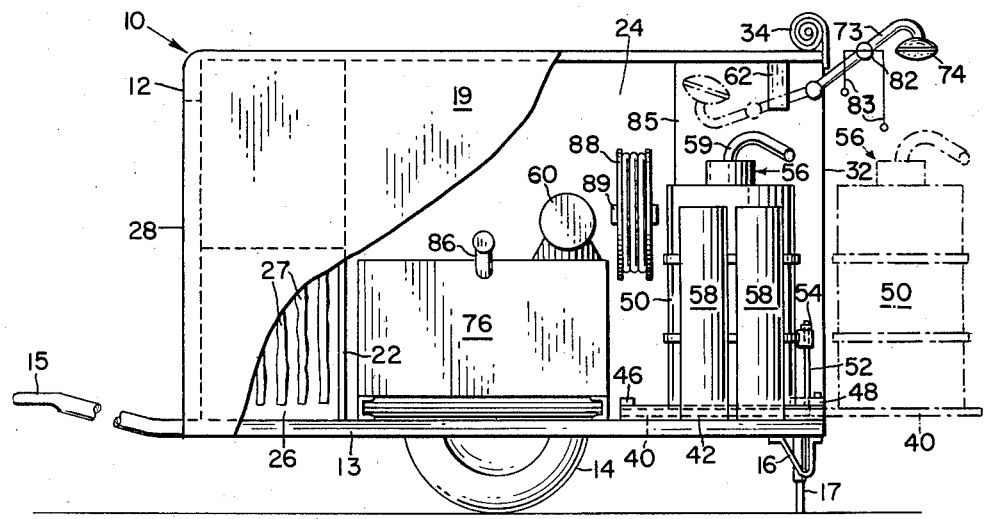
Fig. 1 is a side elevation of the fuel dispensing vehicle, partly in section to show the interior arrangement of the components.
Figure 4:
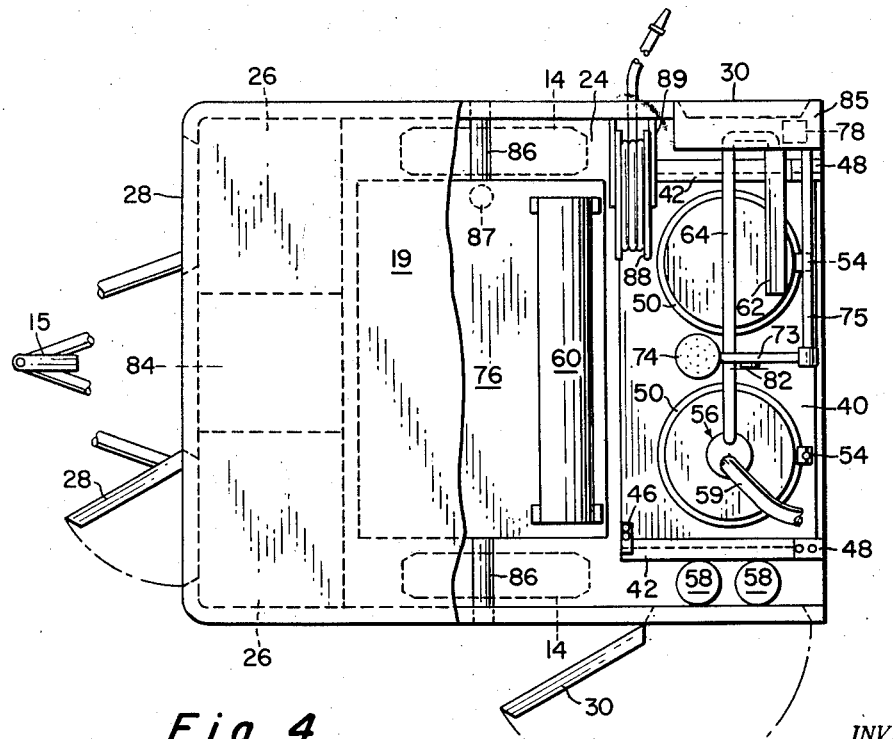
Fig. 4 is a top sectional plan view of the trailer with a portion of the roof removed to show the disposition of the fuel drums on the slidable platform.

Referring now to the drawing wherein like reference numerals designate like or corresponding parts throughout the several views, there is shown in Fig. 1 a fuel dispensing vehicle 10 having a body 12 supported on a chassis 13 including a single pair of wheels 14. Although the vehicle is preferably constructed as a trailer, having a towing yoke 15 and provided with regulation lights connectable to a trailer truck (not shown), it is obvious the invention could be employed in other types of vehicles. When unhitched, the trailer may be made stable by a fixed leg 16 and a telescopic leg 17.

Figure 2:
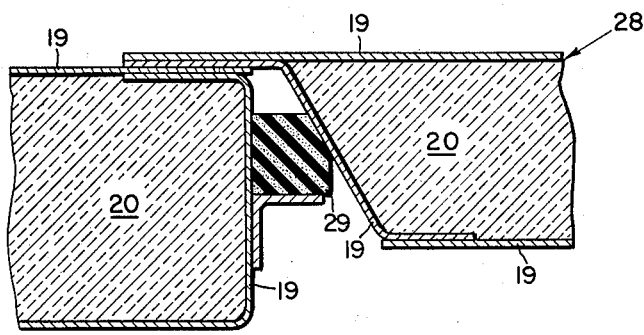
Fig. 2 is an enlarged sectional view of a door and wall construction.
Figure 3:
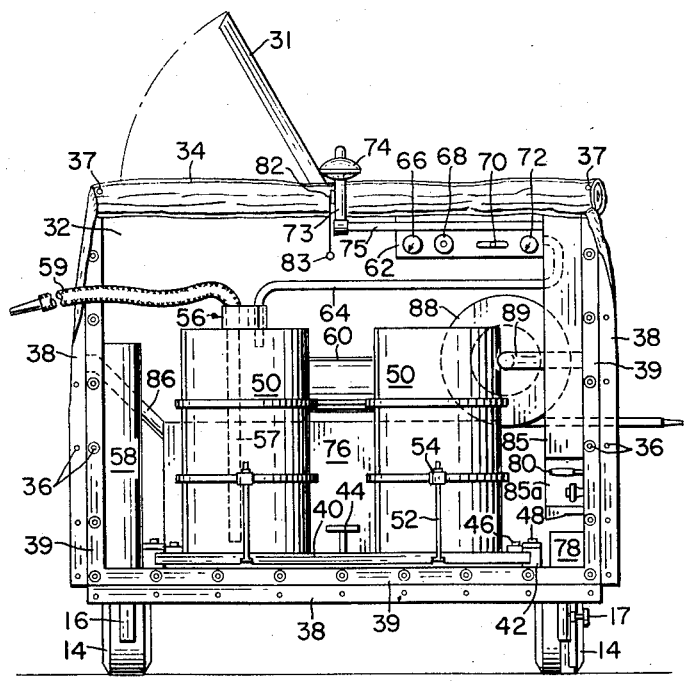
Fig. 3 is a rear elevation of the trailer with the protective curtain rolled up to an open position for dispensing operations.

As highly concentrated hydrogen peroxide is extremely sensitive to impurities, dust and other particulate matter representing the most common, body 12 is constructed of rust-free, noncombustible materials, such as specially treated aluminum alloys. The walls are formed of the aluminum alloy sheets 19 with a filler 20 of suitable heat insulation material, as shown in Fig. 2, to maintain the trailer body at a safe temperature during storage and dispensing of fuel.

Trailer body 12 is divided by a sealed bulkhead 22 into several dustproof compartments providing a rear stowage space 24 for the fuel and associated equipment, and forward clothes lockers 26 for the stowage of protective clothing 27 worn by the trailer crew. Lockers 26 are accessible from outside the trailer by doors 28 sealed when closed by sponge rubber strips 29, and it will be noted that all other spaces are accessible from outside the trailer body being sealed from one another to prevent contamination of each other and of fuel stowage space 24. Fuel stowage space 24 is also provided with access doors 30, one on each side wall of the body, and a hinged hatch panel 31 in the body roof.

Fuel stowage space 24 is accessible through an open end 32 located at the rear of the trailer which also provides a fail-safe area in the event of an explosion in the fuel space. A flexible curtain 34 serves as a rupturable closure for the opening being secured at the upper end thereof for rolling to an open position, as illustrated, or otherwise openable to permit fueling operations. The free edges of the curtain in closed position are disposed within a flap strip 38 having a sponge base 39, both ends of the flap being provided with complementary fasteners 36 which pass through suitable aligned openings 37 in the curtain to provide a substantially dustproof closure means. A dustproof zipper may be substituted for fasteners 36 to enable the curtain to be more expeditiously opened and closed. Curtain 34 is preferably constructed of an inert material, such as polyethylene, quilted with suitable heat insulation material.

A movable platform 40 is slidably mounted on casters between channel beams 42 mounted to the body floor, the platform being extendable from an innermost position completely within the trailer through open end 32 to a position outside the trailer body. The platform is extendable for several reasons which will become apparent. A lock 44 secures the platform to the body in the selected position. A lug 46 on the forward end of the platform engages stops 48 on each channel to limit the extended position of the platform.

Platform 40 is sufficiently wide to house two hydrogen peroxide containers shown stored in their original shipping drums 50 from which the liquid is dispensed. Drums 50 are anchored on the platform by T bars 52 hinged to the platform at one end and terminating in adjustable clamps 54 adapted to engage a flange of the containers. For some power plants using hydrogen peroxide, one of drums 50 can be used for 90% concentrated hydrogen peroxide used as the fuel, and the other drum for 30% concentrated hydrogen peroxide used for passivation purposes. The 30% concentrated hydrogen peroxide is used to cleanse and acclimate new rocket motor systems, or new components subsequently added to the system, to ensure that the system is sufficiently clean to accommodate the 90% concentrated hydrogen peroxide fuel. Because of the likelihood of leakage during storage as well as other reasons, a conventional portable pressure pump assembly 56 is detachably mounted on either container for use only during fueling operations. As the length of pump fuel intake pipe 57 is almost the same as the height of drums 50, the platform and the drums supported thereon are extendable to the exterior position illustrated by phantom lines in Fig. 1 to provide sufficient overhead clearance to install the pump assembly on the drums. The pump when not being used is mounted on one of two distilled water flasks 58 secured within the body which houses the associated intake pipe 57 in a dustproof environment.

Hydrogen peroxide is forced out of the containers into a delivery hose 59 by the introduction of dry nitrogen gas through pump assembly 56 to the top of the containers. The nitrogen gas is supplied by a flask 60, pump assembly 56 via a control panel 62 and a pressure line 64. Flask 60 can be readily replaced without unloading drums 50 by sliding platform 40 outward until sufficient clearance is available, or through hatch 31 or doors 30. Panel 62 is suspended from the overhead of body 12, the panel supporting a nitrogen supply pressure guage 66, a pump pressure regulator 68, a gas pump shutoff valve 70, and a pumping pressure guage 72, all conveniently accessible to the operator through body opening 32.

An important safety feature of the invention resides in the availability of a water supply to wash away hydrogen peroxide leakage at the pump, the containers, or at the vehicle being serviced. Hydrogen peroxide at 90% concentration in the presence of impurities, such as dust, will readily break down into steam and free oxygen and obviously in confined areas will be highly explosive in nature. It is therefore important to dilute any fuel leakage with water to a safe concentration. For leakage in and around the trailer, a water shower system includes a large volume shower head 74 mounted on a swivel arm 73 to the trailer body at the open end, and is pivotable from a position within the trailer body to a position outside the trailer body. In each position shower head 74 is in a location to flood drums 50 with water while supported in either position of platform 40. With the platform housed inside the trailer and the shower head 74 in the outward position, adequate standing space is available thereunder to enable the trailer crew to wash fuel leakage from their protective clothing during filling operations and before storage.

Shower head 74 is connected by line 75 to a water supply tank 76 having approximately 300 gallon capacity mounted on the chassis over the axle, pressure being supplied by a motor and water pump unit 78. The shower system is regulated by a main control valve 80, and a quarter turn shower head valve 82 having a pull chain control 83, both valves being readily accessible from outside the trailer for immediate use. The pump motor is driven by a pair of 12-volt batteries (not shown) housed in a forward trailer compartment 84 located between lockers 26 and having provision for external attachment of battery charging cables. Pump unit 78 and associated piping between the fuel containers and panel 62 may be housed in a compartment 85 formed adjacent one wall of the trailer body, the compartment extending the height of the body and provided with a window 85a for access to valve 80. Water tank 76 has a pair of external filler necks 86 located at opposite sides of the trailer and an external drain outlet 87 accessible from beneath the chassis and positioned at the low side of the sloping tank bottom. To enable hydrogen peroxide leakage to be washed away at a remote point of filling, i. e. parked aircraft, a fifty foot rubber hose having a suitable nozzle is connected to tank 76 and stored on a spring-loaded reel 88 mounted on trunnion arms 89 inside the trailer body, the hose being accessible from the trailer exterior on one side of the body for ready use.

This invention provides a self sufficient, fireproof fuel dispensing and storage trailer having a dustproof construction to minimize contamination of the fuel and the explosive effects. In the event of explosion, a fail safe area is provided to localize the danger area and damage therefrom, this area being closed by a flexible rupturable curtain. The fuel containers are supported on a slidable platform which enables the trailer to be smaller, more accessible, and safer. A safety water shower and hose system is available to wash away the fuel leakage from equipment and personnel.

Obviously many modifications and variations of the present invention are possible in the light of the above teachings. It is therefore to be understood that within the scope of the appended claims the invention may be practiced otherwise than as specifically described.

I claim:

1. A vehicle supporting equipment for storing and dispensing highly volatile fuel comprising a chassis having an enclosed dustproof body, one wall of said body being open providing a fail safe area, a flexible rupturable curtain for closing said body opening, readily detachable means for securing the edges of said flexible curtain to the body in sealed relation, said chassis being provided with a slidable platform capable of supporting a fuel container, said platform being extendable from a position completely within the body to a position outside said chassis through the opening, and pressure means for dispensing fuel from a container when supported on the platform.

2. The vehicle of claim 1, wherein the walls of said body and curtain are heat insulated.

3. The vehicle of claim 1 wherein the platform extends for substantially the width of said body and is capable of supporting two fuel containers in lateral disposition.

4. The vehicle of claim 1 wherein said vehicle is provided with a water shower head capable of being positioned outside said body through said opening and over said extended position of the platform, a water supply tank, a pump system, and a control means for operating said shower.

5. A trailer supporting equipment for storing and dispensing hydrogen peroxide fuel comprising a chassis having an enclosed dustproof and insulated body, one wall of said body being open providing a fail safe area, a flexible rupturable curtain closing said opening, readily detachable means for securing the edges of said flexible curtain to the body in sealed relation, said chassis being provided with a slidable platform capable of supporting a hydrogen peroxide container, means for detachably securing said container to the platform, said platform being extendable from a position completely within the body to a position outside said body through the opening, means for locking said platform, a supply of nitrogen, a pressure pump assembly adapted to be mounted on said container for introducing nitrogen into the container, a delivery hose connected to the pressure pump assembly, a water shower capable of being extended from a position within said body to a position outside said body through said opening and over the extended position of the platform, a water supply tank mounted in the body, a water pump system, and a control means for said water system.

References Cited in the file of this patent

UNITED STATES PATENTS

| | | |
|---|---|---|
| 1,139,353 | Ellis | May 11, 1915 |
| 1,979,549 | Huckel | Nov. 6, 1934 |
| 2,118,704 | Grontkowski | May 24, 1938 |
| 2,501,004 | Reese | Mar. 21, 1950 |
| 2,520,380 | Wegman | Aug. 29, 1950 |
| 2,561,265 | Burns | July 17, 1951 |